Aug. 30, 1938.  A. P. ARMINGTON  2,128,216

YIELDABLE MOUNT MEANS

Filed March 30, 1935

INVENTOR
ARTHUR P. ARMINGTON
BY
Brockett, Hyde, Higley & Meyer
ATTORNEYS

Patented Aug. 30, 1938

2,128,216

UNITED STATES PATENT OFFICE 2,128,216

YIELDABLE MOUNT MEANS

Arthur P. Armington, Willoughby, Ohio, assignor to The Euclid Road Machinery Company, Euclid, Ohio, a corporation of Ohio Application March 30, 1935, Serial No. 13,807

1 Claim. (Cl. 248—358)

This invention relates to means for interconnecting large heavy objects for support of one on the other to permit limited yieldably-opposed motion therebetween. The invention thus comprises a heavy duty mounting means useful for application such as between an engine and its base, or between the frame of a railway vehicle and its running gear. This application is a continuation in part of my copending application, Serial No. 756,501, filed December 7, 1934 now matured into Patent No. 2,073,617, of March 16, 1937.

The invention contemplates the employment of a resilient element of rubber or the like, and its objects are to provide a novel and superior form of such element and of the associated parts by which it is connected with the members between which it is to be effective, that the element may cooperate with its associated parts to the best advantage.

A particular object of the invention is to provide that maximum forces may be transmitted in one direction between the members, as vertically, such as caused by the weight of the supported member, yet amply great forces may be transmitted in a transverse direction as horizontally such as caused by the draft loads in a rail vehicle; and at the same time other substantial forces in any other direction may be transmitted.

The invention is particularly adapted to transmit maximum compressive forces in one direction. Obviously in most applications of the invention, these compressive forces will be downward as in the mounting of one object or member upon another. Therefore the invention is herein illustrated, described and claimed in terms having reference to such disposition of parts. This, however, is to be understood as merely for convenience, it being obvious that the parts may be disposed otherwise, dependent upon the direction of the principal forces which are to be transmitted.

Figure 1:
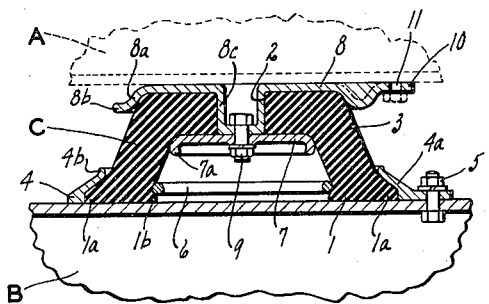
Figure 2:
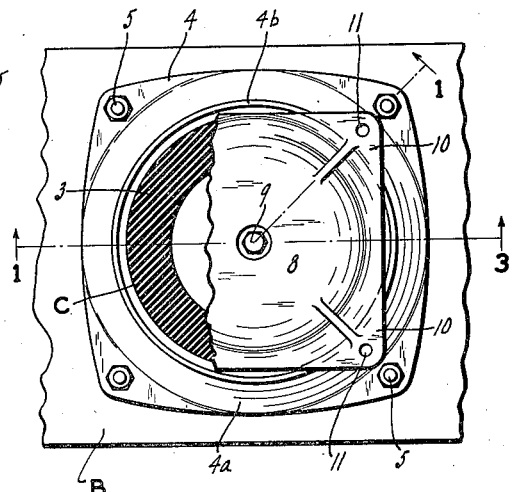
Figure 3:
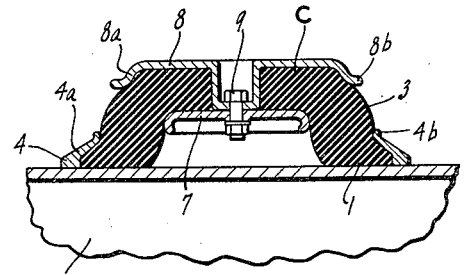
Figure 4:
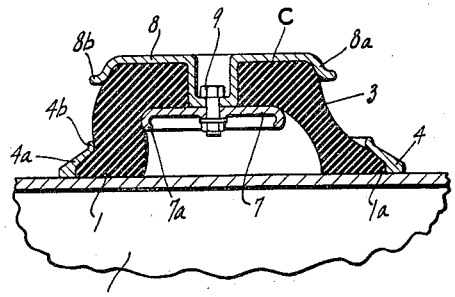
Figure 5:
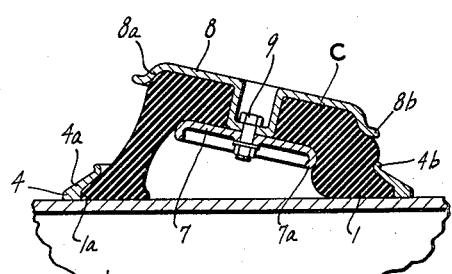

The exact nature of this invention together with further objects and advantages thereof will be apparent from the following description taken in connection with the accompanying drawing, in which Fig. 1 is a sectional elevation and Fig. 2 a plan view illustrating an embodiment of the invention, the section of Fig. 1 being as in the planes of line 1—1, Fig. 2, parts being broken away in Fig. 2 to show details of construction; Figs. 3, 4 and 5 are typical sectional elevations as in the plane of 1—3, Fig. 2, illustrating the operation of the invention under relative stresses between supporting and supported parts respectively in vertical, horizontal, and tilting directions.

With reference now to the drawing, the broken lines at A represent the member to be supported, and B represents conventionally the member from which support is to be had. C is a resilient element of rubber or the like, generally bell-shaped, upwardly convex and downwardly concave and preferably of circular section as indicated in Fig. 2. It is slightly enlarged outwardly as at 1a and inwardly as at 1b at its mouth end 1. At its opposite end the element is flat as indicated in Fig. 1 and has a central through opening 2. The element is generally conical at its central intermediate part 3.

The element rests as indicated in Fig. 1, directly upon the supporting member B, the latter being provided with a flat face of sufficient area to underlie the entire face of the element. Means are provided for clamping the mouth end of element C to the supporting member B. Such means is here shown as a ring clamp casting 4 extending peripherally about the mouth end of the element, secured with the member B as by bolts 5 and having a flange part 4a extending radially inwardly with an oblique face portion in overlying relation with the outwardly extending toe part 1a of the element C. It will be observed that the ring 4 by its oblique face portions not only firmly yet detachably secures the element C to the member B, but also provides a wedging effect of the element beneath the ring when lateral stresses are met. The flange 4a terminates inwardly in a lip 4b outturned from the element C.

An endless ring member 6 may be pressed into the cavity of the element C to seat just above the inward toe part 1b as indicated in Fig. 1, to improve the confining effect between the element and the securing member 4, if it is desired that the apparatus transmit heavy tensile stresses.

The opposite end of the element C is secured to the member A to be supported. For this purpose a pair of clamp parts are provided, including the part 7 within the hollow of the element C and the clamp part 8 on the outside of the element. The part 7 fits the inner end of the element cavity as indicated, and has an inwardly turned peripheral lip 7a. The clamp part 8 has a flange 8a extending peripherally about the element to provide a confining seat for the latter, terminating in an outturned lip 8b. The clamp parts 7 and 8 are rigidly interconnected by way of the opening 2 of the element as by a stem part 8c fitting in the opening 2, integral with the clamp part 8 and connected with the clamp part 7 as by a bolt 9. The clamp part 8 is extended radially outwardly at intervals as at 10 where it is provided with holes 11 by which it may be bolted to the under face of the supported member A.

It will be apparent that by the means described, the element C is disposed between the supporting and supported members with its mouth end secured to one, its opposite end to the other, and with slopingly disposed laterally unconfined portions intermediate its ends.

It will be noted also that the described assembly is a simple one, easily made from few parts. The ring casting 4 being slipped over the element C before intersecuring the clamping members 7 and 8 by the bolt 9, a mounting unit is formed immediately boltable to the members between which the mounting is to be made. Where the ring 6 is to be used, its inner diameter is sufficient to permit passage therethrough of the inner clamp member 7, so that once the ring 6 is applied, the member 7 may be freely disassembled thereafter.

The fit of the end wall of the element C between the clamp members 7 and 8 is a snug one generally providing clamping effect endwise of the element but the length of the stem 8c is such that the material of the element C is not greatly compressed if at all, therebetween.

Operation will be apparent. Vertical compressive stresses, as set up by the dead weight of the supported member A, will cause deformation of the element C as indicated in Fig. 3. Such deformation will be observed as taking place mostly at the annular conical part 3 of the element, the securing means at the mouth end of the element providing clamping effect both endwise and peripheral of the element to prevent spreading at the mouth.

Under stresses setting up horizontal displacement between the supporting and supported members, as indicated in Fig. 4, deformation of the element C is likewise principally at its intermediate part 3, this being shortened and thickened on one side, and lengthened and thinned at the other, and the clamping action at the mouth of the element being effective increasingly over half its periphery as such displacement stresses increase.

Tilting displacement between the supporting and supported members is illustrated in Fig. 4, deformation of the element C still taking place substantially at the intermediate part 3, this being lengthened and thinned on one side and shortened and thickened on the other, and the element still being secured between the members by the clamping effect at its ends.

In each of the three described cases of motion, therefore, as in any of the possible combinations thereof, deformation of the element C will be largely confined to its conical intermediate part 3, this part resisting the deformation substantially entirely about its endless section. Where the applied forces are wholly compressive as illustrated in Fig. 3, the resistance to deformation is uniform about the intermediate annulus 3. This annular wall part 3 being of conical form, its buckling either inwardly or outwardly is prevented. In the other cases such as illustrated in Figs. 4 and 5, this annulus has forces upon it varying from maximum compression at one side to either minimum compression or maximum tension on the opposite side. In any event the described lip parts outwardly turned from the element C at the edges of those parts otherwise confining the element C, prevent any cutting effect by which the element might otherwise be damaged.

Considering the assembly from the viewpoint of its typical section, as illustrated in Figures 1, 3, 4 and 5, the member B is provided, by the member 4, with a pair of opposed recesses divergent towards each other and into which opposed base parts of element C seat. The element has opposed wall parts extending convergently beyond these recesses, each thus having a truss effect upon the other for resisting lateral stresses, as in Figure 4, while both serve together in resisting compressive stresses, as in Figure 3. The greater such compressive stress the firmer are the opposite base extremities of the element seated in the recesses, which of course also prevent spreading of the opposed wall portions of the element.

What I claim is:

Means for yieldably interconnecting a pair of members for support of one upon the other, and comprising a resilient bell-shaped element of rubber or the like arranged between said members upon an axis extending therebetween, means securing the mouth end of said element and including confining means extending peripherally thereabout in overlying relation therewith and secured to the near one of said members, means securing the other member to the opposite end of said element, and rigid means disposed within the mouth part of said element to back the latter against said confining means.

ARTHUR P. ARMINGTON.